United States Patent Office 3,403,516
Patented Oct. 1, 1968

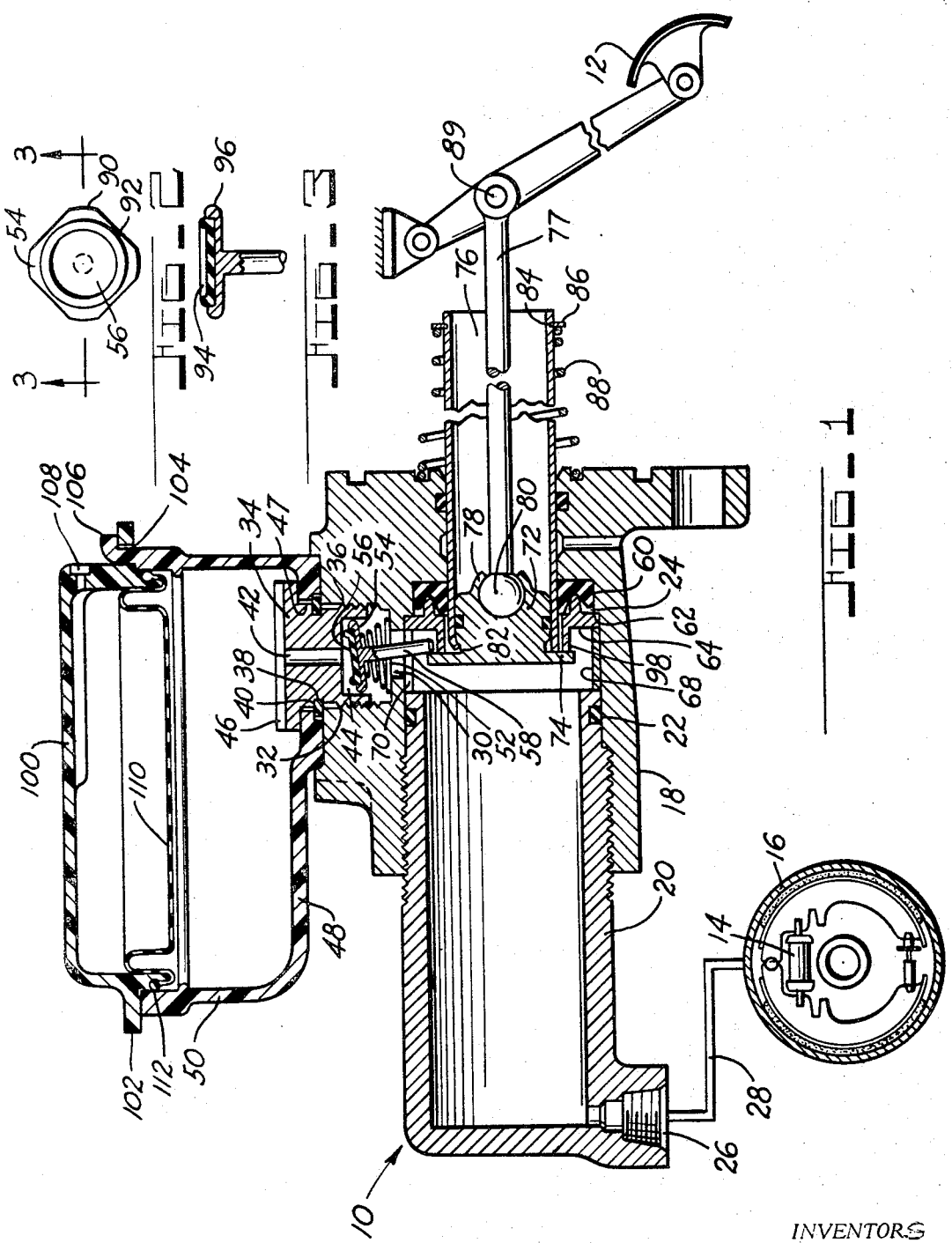

3,403,516
TILTING VALVE MASTER CYLINDER
Darwin Krieger, St. Joseph, Mich., and Harvey E. Wortz, Kokomo, Ind., assignors to The Bendix Corporation, a corporation of Delaware
Filed Nov. 25, 1966, Ser. No. 596,991
8 Claims. (Cl. 60—54.6)

ABSTRACT OF THE DISCLOSURE

This invention relates to a master cylinder with a tilt valve that is operated by the fluid displacement means within an actuator to control the communication of its reservoir to its internal chamber, which tilt valve is placed within a circular chamber and comprises a plate of generally square configuration to locate the valve within the chamber while providing a limited flow passageway between the valve and the walls of the chamber. This reduces tolerance cumulations that in the past provided displacement losses on the initial application of the master cylinder.

Related patents

This invention is related to and is an improvement of U.S. Patents Nos. 2,574,923, 2,574,969, 2,683,352, 2,880,584, 2,934,902 and 3,232,059.

Summary

An object of the present invention is to provide an improved valve device between a variable volume chamber and a fluid reservoir in a fluid actuator which, as with prior art devices, eliminates the need for the "uncovered port" approach to compensation, and thus removes the possibility of actuator failure due to scuffing of a sealing cup as it passes over a port provided in the wall of a cylinder.

It is a further object of this invention to provide a valve device, as aforementioned, which is constructed to provide controlled displacement losses during initial application of the fluid actuator.

It is still another object of this invention to provide a valve, of the aforementioned type, which employs a reduced number of parts than has been heretofore present by the prior art structures, and which therefore, is more practical and economical to manufacture, more easily assembled and more predictable in performance after assembly.

Drawing description

FIGURE 1 is a schematic showing of a vehicle brake system having a master cylinder in cross section employing a valve in accordance with the principles of this invention;

FIGURE 2 is a plan view of a tilt valve in accordance with the principles of this invention; and FIGURE 3 is a cross sectional side view of the valve of FIGURE 2 taken along lines 3—3 thereof.

Detailed description

With more particular regard now to FIGURE 1, there is shown a master cylinder 10 that is actuated by a brake pedal 12 to develop a fluid pressure for wheel cylinders 14 of a vehicle's wheel brakes 16. The master cylinder is constructed by casting or otherwise forming a body 18 and threading a cylinder 20 having a seal 22 adjacent its open end into an open ended bore 24 of the body 18. The cylinder 20 is provided with an outlet port 26 to which a conduit 28 is connected that leads to the wheel cylinder 14. The body 18, on the other hand, is provided with a reservoir or inlet port 30, that is threaded, as at 32, for the assembly thereto of a reservoir hold-down plug, or fitting, as it may be termed, 34 having threads 36. The fitting 34 is grooved as at 38 for the receipt of a seal 40, and it is provided with a passageway 42 leading to a valve chamber 44 on one end and a radial notch 46 on the other.

The fitting 34 is inserted through an opening 47 in a base 48 of a plastic reservoir having an annular wall 50 and the seal 40 is then inserted in the groove of the fitting 38 to hold the fitting 34 to the base 48. Thereafter the fitting is screwed into the body 18 to assemble the reservoir to the body and cylinder. However, prior to this assembly, a conical spring 52 is inserted over the inlet port 30 and a tilt valve comprising a plate 54, a rubber or similarly resilient disc valve 56 and a stem 58 is inserted through the spring to have the stem 58 projecting within the bore 24 of the body 18.

It is necessary prior to the assembly of the reservoir to the body that a seal 60 be placed in the bore 24 behind a shoulder 62 thereof and a seal retainer 64 be placed against the shoulder 62 and held thereto by a collar 68 that is split, as at 70. A fluid displacement member comprising a plug 72 with a radial flange 74 and a rearwardly projecting sleeve 76 is inserted through the opening in the bore 24 of the body 18 to project rearwardly therefrom. Thereafter the reservoir connection to the body 18 may be accomplished with the cylinder 20 being the last member to be assembled to the body 18.

Prior to the insertion of the fluid displacement member into the body 18 a push rod 77 is affixed to plug 72 by swaging the ends 78 over the ball end 80 of the push rod, and the sleeve 76 is assembled to the plug 72 by swaging the forward ends of sleeve 76 into a recess 82 of the front portion.

The sleeve 76 is provided with an annular recess 84 for the receipt of a snap ring 86 forming a bearing plate for a return spring 88 that is assembled between the body 18 and the ring 86 prior to the assembly of the master cylinder 10 to a firewall or the like of an associated vehicle. It should be appreciated that the push rod 77 is also provided with a bifurcated end for connection to a pin 89 that unites the brake pedal 12 to the push rod 77.

With reference now to FIGURE 2, it can be readily observed that the plate 54 is provided with rounded corners 90 connected by flats 92 to restrict the passage between the walls of the valve chamber 44 and the plate 54. The resilient disc 56 has an annular raised seat 94 which will appear in greater detail in FIGURE 3. Also it should be noted, with reference to FIGURE 3, that the rounded corners 90 have also been rounded, as at 96, in a vertical direction to permit low-friction sliding action of the tilt valve in the valve chamber 44. The plate 54 can be machined from round stock, or a square plate with or without rounded corners could be used. The reservoir holddown plug 34 is manufactured so as to have the valve chamber 44 concentric with the diameter of the threads 36.

Finally, with reference again to FIGURE 1, it should be noted that the seal retainer 64 is provided with a forwardly projecting stop 98 that cooperates with the flange 74 of the fluid displacement member to limit the retracted position of the member 72 as caused by the return spring 88.

In completing the construction of the master cylinder, the reservoir 50 has a cap 100 provided with a flange 102 having notched openings 104 cooperating with ears 106 of the annular wall 50 so that it may be inserted over the ears and twisted to a position where a cap is locked to the annular walls. Furthermore, the cap is provided with an atmospheric vent 108 and a diaphragm 110 having a peripheral bead 112 is affixed to the cap to completely seal the chamber internally of the annular walls 50 between the diaphragm 110 and the base 48.

It may thus be appreciated that a master cylinder, or fluid actuator, has been provided which has a tilt valve in the communication between its reservoir and its cylinder whose position is critically controlled and whose design provides a limited passageway for fluid flow about its periphery. Furthermore, a seal retainer has been provided with a stop to limit the rearward position of the fluid displacement member 72 which controls the attitude of the stem 58 to further control fluid displacement losses that have occurred in prior art structures during the initial application of the fluid displacement member within a fluid actuator of this type.

Having fully described a manner of construction which embodies the principles of our invention, it is not intended that such construction be construed to limit the protection sought for this invention, but that such protection be set forth by the appended claims.

We claim:

1. A master cylinder for hydraulic brake systems comprising:
   a housing having a bore therein with an inlet port and an outlet port in fluid communication with said bore;
   a hollow reservoir member having an annular wall and a base portion which is of thicker cross section than said wall adjacent an opening therethrough, said thicker cross section having an annular recess on the exterior side of said base, said reservoir having also a removable cap to which is affixed a diaphragm to abridge the annular walls of said reservoir when said cap is assembled thereto, said cap having an atmosphere relief above said diaphragm;
   a fitting operatively connected to the opening in said base for joining said reservoir to said housing at said inlet opening, said fitting having a seal means cooperating with said annular recess, and further having a passageway therethrough leading to a circular valve chamber in said fitting adjacent said inlet opening;
   a valve for controlling said passageway, which valve includes a plate of generally square configuration having a recessed portion in which a rubber washer having an annular valve seat is affixed, said square plate being held in said circular chamber by a spring between said housing about said inlet opening and said plate, said plate having a depending stem projecting through said inlet opening;
   a movable member in said bore operatively connected to said stem for controlling said valve such that said valve is open when said member is in its retracted position in said bore and said valve is closed when said member moves away from its retracted position; and
   an operator-operated means to control said member including a spring to normally maintain said member in its retracted position.

2. A master cylinder according to claim 1 and further comprising a seal in said bore about said member and a seal retainer abutting a shoulder in said bore which is held there by a split collar, said seal retainer having a stop means for said member to predictably limit the retracted position of said member and thereby control displacement losses at the initial actuation of said operator-operated means.

3. A master cylinder according to claim 2 wherein said fitting may be further characterized as a threaded plug whose valve chamber is concentrically located with respect to the pitch diameter of the threads thereof.

4. A master cylinder according to claim 1 wherein said plate has its corners rounded to match the diameter of the chamber and rounded in a vertical manner to facilitate ease in sliding in said circular chamber which rounded corners are connected by flat sides to limit the flow passageway between said valve and the walls of said valve chamber.

5. A fluid cylinder comprising:
   a housing having a reservoir port and an outlet port open to an internal chamber that is open at one end;
   a reservoir for supplying fluid to said reservoir port including a plug operatively connected to said reservoir and to said housing, said plug having a fluid passageway communicating the interior of said reservoir to said reservoir port which fluid passageway includes a circular valve chamber;
   a plate having guiding corners joined by straight sides within said circular valve chamber, said plate mounting a resilient disc valve seat in said valve chamber to control fluid flow between said reservoir port and said internal chamber, said plate having a stem extending into said internal chamber;
   an operator-operated fluid displacement means within said internal chamber, which fluid displacement means is operatively connected to said stem to control said plate and its disc valve; and
   means to seal the open end of said internal chamber about said fluid displacement means which also limits the retracted position of same to control fluid displacement losses to a minimum.

6. A master cylinder according to claim 5 wherein said plate is a square plate having compound round corners joined by flat sides with limited flow passage between its sides and the walls of the circular valve chamber wherein said corners permit tilting of said plate with reduced frictional forces upon contact of said stem by said fluid displacement means.

7. A master cylinder according to claim 6 wherein said means to seal the open end of said internal chamber about said fluid displacement means includes a seal and seal retainer with said seal retainer having a stop means operatively engaging said fluid displacement means to limit the retracted position of said fluid displacement means to in turn control the opening of said passage by controlling the tilt of said square plate and its disc valve in said valve chamber.

8. A master cylinder according to claim 6 wherein said valve chamber is concentric with respect to the axis of said plug such that the stem position within said internal chamber is maintained consistent.

References Cited

UNITED STATES PATENTS

| 1,964,111 | 6/1934 | Dobrick | 251—40 |
| 2,023,788 | 12/1935 | Miller | 251—40 XR |
| 3,232,059 | 2/1966 | Thesier | 60—54.6 |

MARTIN P. SCHWADRON, *Primary Examiner.*

ROBERT R. BUNEVICH, *Assistant Examiner.*